United States Patent [19]

Liu

[11] Patent Number: 5,124,516
[45] Date of Patent: Jun. 23, 1992

[54] PRESSURE DRIVING CUT-OFF TYPE MANOMETER

[76] Inventor: Miu-Tsu Liu, No. 15, Fu Chou 8 Street, Chia Yi City, Taiwan

[21] Appl. No.: 552,571

[22] Filed: Jul. 16, 1990

[51] Int. Cl.[5] .............................................. H01H 35/34
[52] U.S. Cl. .................................. 200/835; 200/83 R
[58] Field of Search ................ 200/83 R, 83 A, 83 B, 200/83 C, 83 N, 83 S, 835 A

[56] References Cited

U.S. PATENT DOCUMENTS

| | | | |
|---|---|---|---|
| 2,839,630 | 6/1958 | Wood | 200/83 C |
| 3,444,341 | 5/1969 | Mighton | 200/82 C |
| 3,911,393 | 10/1975 | Biggs | 200/83 N X |
| 4,160,139 | 7/1979 | Johnston | 200/83 N |
| 4,211,901 | 7/1980 | Matsuda et al. | 200/83 B |
| 4,456,801 | 6/1984 | Lauritsen et al. | 200/83 P |
| 4,626,636 | 12/1986 | Hickman et al. | 200/83 P |
| 4,644,116 | 2/1987 | Miyakawa | 200/83 R |
| 4,724,289 | 2/1988 | Heissler | 200/82 R |
| 4,965,422 | 10/1990 | Liu | 200/83 S |

Primary Examiner—J. R. Scott
Attorney, Agent, or Firm—Bacon & Thomas

[57] ABSTRACT

A manometer device having an adjusting head, an adjusting screw attached to the adjusting head, and an electrically conducting plate. Electric wires are connected to the adjusting screw and the conducting plate; and to a control for a fluid driver. With this mechanism, the manometer communicates with a space with fluid pressure to be measured. The fluid pressure urges the conducting pressure damper plate upwardly into contact with the adjusting screw to cut off the current in the circuit of the fluid driver when the pressure in the space to be measured reaches the pre-set pressure.

1 Claim, 3 Drawing Sheets

PRESSURE DRIVING CUT-OFF TYPE MANOMETER

BACKGROUND OF THE INVENTION

The present invention relates to a manometer device, and more particularly to a manameter which can be connected with fluid drivers, such as, air compressor, pump, etc. and which can determine the pressure in the space to be measured. When the pressure in the space to be measured reaches the setting value, it causes the circuit of the power supply to open to cut-off the electrical circuit of the fluid driver.

The manometer has a wide range of uses, for example, it is required by various chemical factories, manufacturing factories, assembly plants, etc. The known manometers are used solely to measure the pressures of fluids, they are unable to be connected to act with the controller of a power supply and fluid drivers such as air compressors or pumps. Under such circumstances, while the pressure in the space to be measured, exceeded the setting value, the fluid drivers, etc. are still in operation, resulting in the pressure in the space to be measured exceeding the setting value. Meanwhile, the structure of the known manometer is extremely complicated, causing trouble and increasing the cost of the manometer.

SUMMARY OF THE INVENTION

In view of the above shortcomings of the manometers commonly used, the main objects of the present invention are to provide a manometer which can be connected with an air compressor or pump and one in which the set pressure is variable. When the pressure in the space to be measured exceeds the setting value, the circuit of the fluid driver opens and the fluid driver stops to maintain a constant pressure inside the space to be measured.

The structure of the above manometer is simple with less components, so it is more reliable and its cost is lower.

The present invention will become more readily apparent from the following description of the preferred embodiment of the present invention taken in conjunction with the accompanying drawings.

DETAILED DESCRIPTION OF THE PREFERRED EMBODIMENTS

Figure 1:
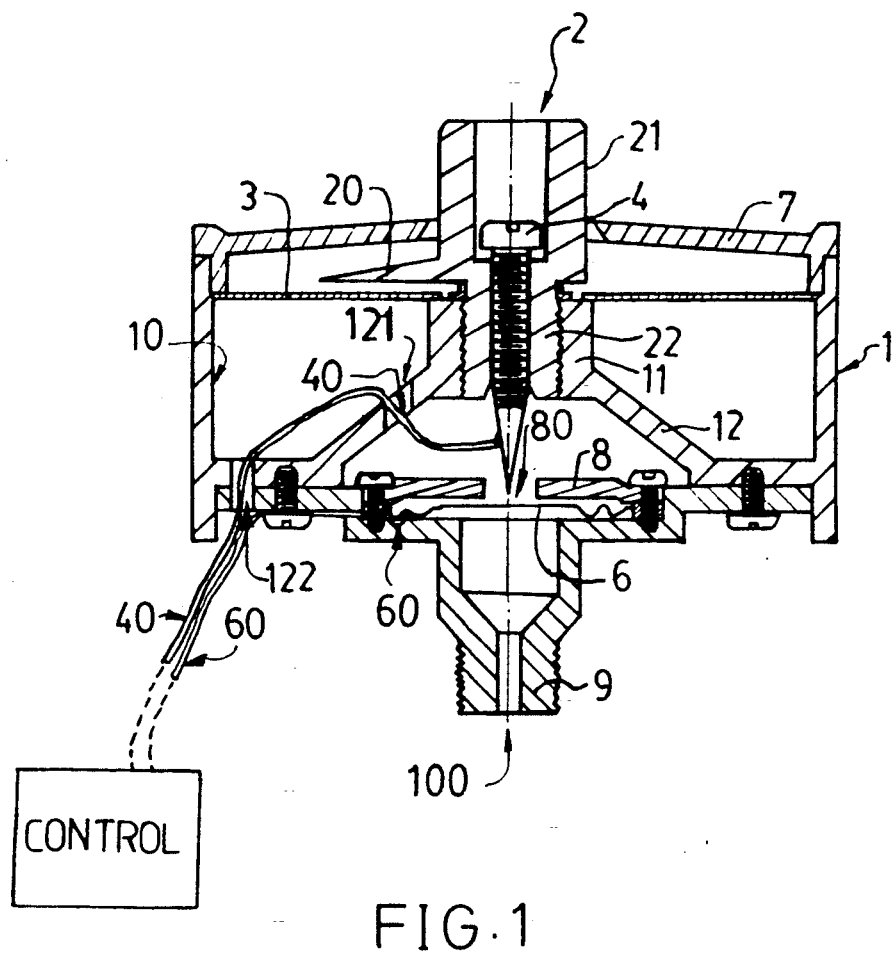
FIG. 1 is a cross-sectional view of the present invention.
Figure 2:
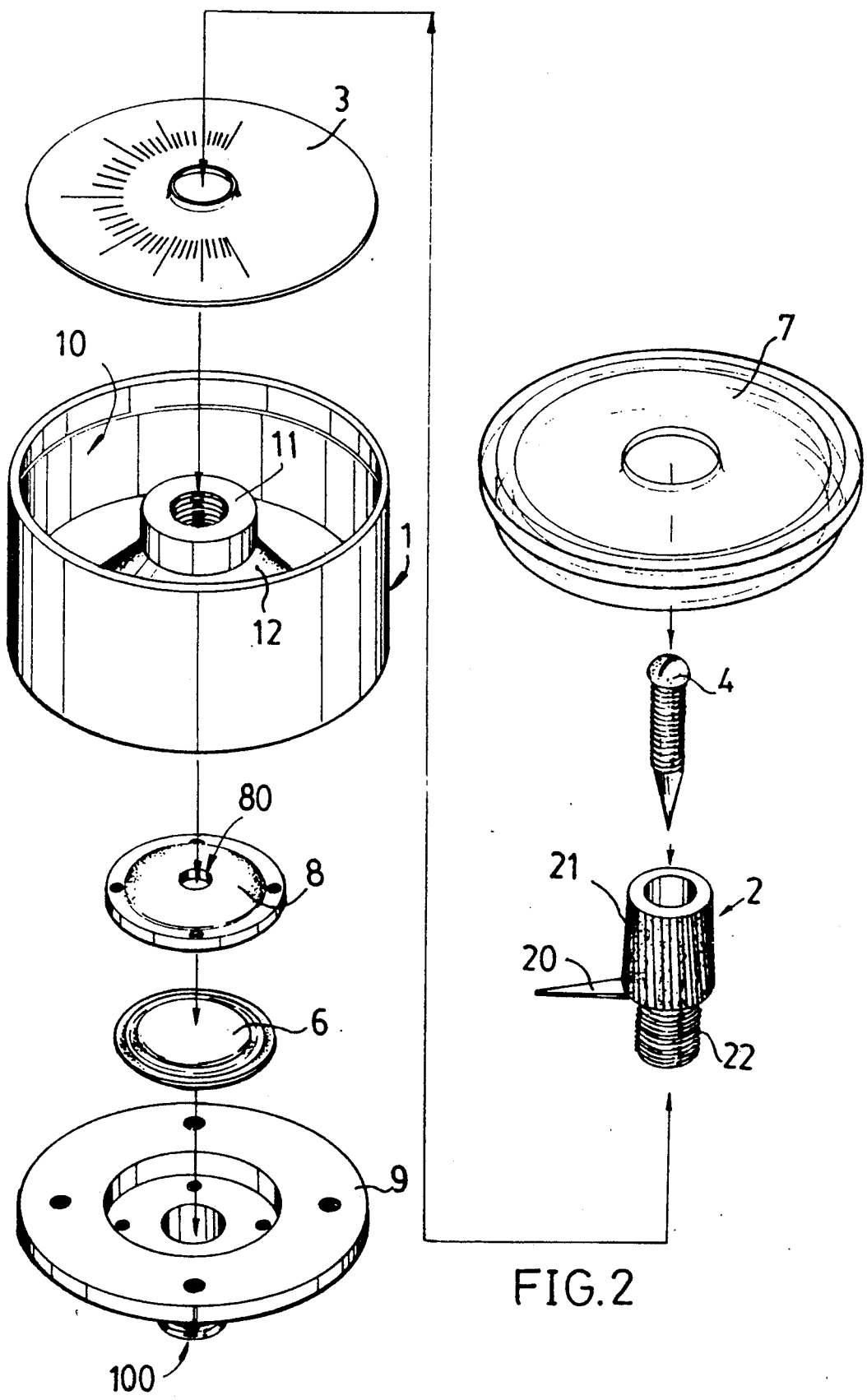
FIG. 2 is an exploded perspective view showing the components of the structure of the present invention.

Referring to the FIGS. 1 and 2, the pressure device of the present invention includes a case 1, an adjusting head 2, a scale board 3, a micro-adjusting screw 4, an electric conducting plate 6, a transparent cover 7 and a pressure damper 8, wherein, the case 1 is hollow and to be used for containing components, it can be formed as a short cylinder. There is a threaded tube 11 formed in its central part and base plate 12 is then formed between the base of the threaded tube 11 and the inner wall of the cover 10 of the case 1. The internal wall of the threaded tube 11 forms threads.

There are multiple holes 121, 122 formed in the bottom board 12. The adjusting head 2 has a cap shape with cored bottom, a pointer 20 formed on the periphery of the cap shaped body 21, and a tubular screw body 22 extending downward from the lower end of the cap shaped body 21. Both the outer and inner wall of screw body 22 are formed with threads so as to enable the screw body 22 be screwed into the threaded tube 11. The scale board 3 is a circular board, with scales around the periphery of the surface of the board to indicate the set pressure.

There is a micro-adjusting screw 4 screwed into and penetrating through the screw body 22. The micro-adjusting screw 4 is fixed with an electric wire 40 extruded through the holes 121, 122 on the bottom board 12, and extending outside the case 1.

While the above components were installed inside the case 1, a transparent cover 7 is installed on the top of the case 1, and a pressure damper 8 is placed under the bottom of the case 1. There is also a hole 80 in the middle of the pressure damper 8 to let the micro-adjusting screw 4 penetrate through the pressures damper 8 from its upper surface. Beneath the pressure damper 8 is an electric conducting plate 6 with its external edge fixed onto the outer surface of the pressure damper 8. A thrust body 9 is installed on the lower part of the electric conducting plate 6, and an electric wire 60 is fixed on the electric conducting plate 6 and led to the outside portion of the case 1.

Figure 3:
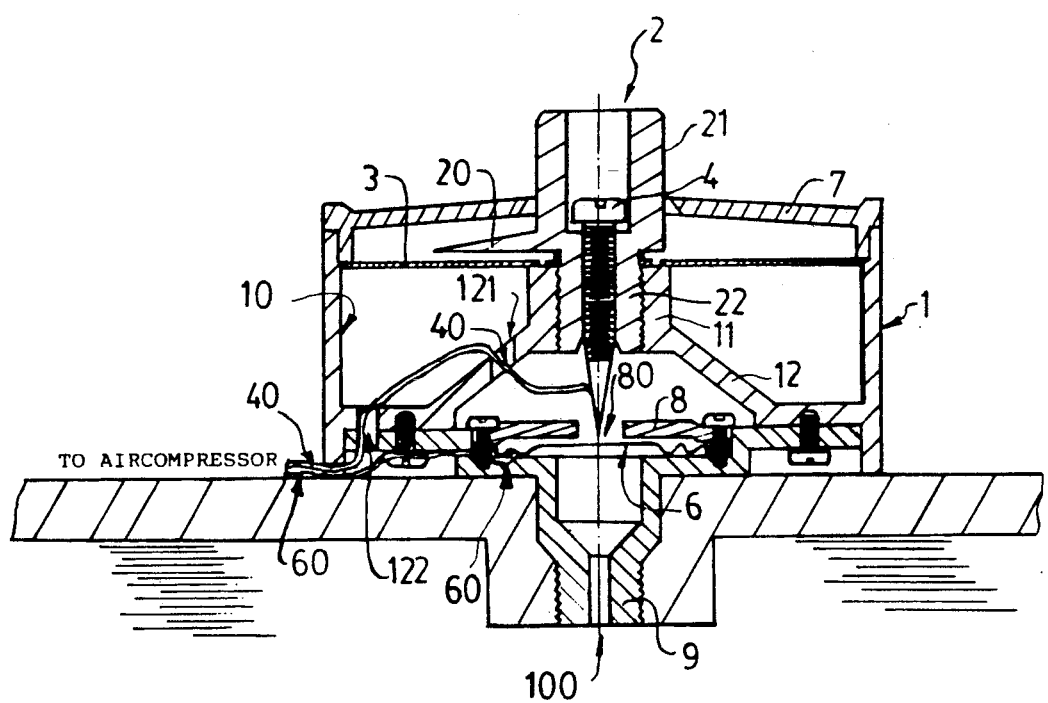
FIG. 3 is a cross-sectional view of the present invention in operation.

Refering to FIG. 3, using the present invention, the thrust body 9 on the bottom of the present invention is exposed to the pressure in the space to be measured, and the space to be measured maintains the switch closed. Turning the cap shaped body 21 with the pointer 20 to make the pointer 20 point to the scale 3 to represent the setting pressure, causes the screw body 22 integrated with the cap shaped body to turn, which causes the screw body 22 move up and down with the micro adjusting screw 4. After the micro adjusting screw 4 is turned, the distance between the conducting plate 6 and the tip of micro adjusting screw 4 is changed and the above distance is proportional to the value of the pressure pointed by the pointer 20. The fluid in the space 100 to be measured comes in from the thrust body 9 to push the electric conducting plate 6. The electric conducting plate 6 will push upward gradually. When the electric conducting plate 6 is pushed into contact with the tip of the micro-adjusting screw 4, a relay connected to the wires 40, 60 becomes effective, turning off the circuit to the fluid driver, the fluid driver becomes ineffective and the pressure of the fluid inside the space to be measured reaches a constant value and it would not go up continuously any longer.

Based on the above description, the manometer of the present invention ensures that the pressure inside the space to be measured will not go up continuously and it offers a safeguard for security in the industrial world.

Obviously, many modifications and variations of the present invention are possible in light of the above teachings. It is therefore to be understood that within the scope of the appended claims, the present invention may be practiced otherwise than a specifically described herein.

I claim:

1. A manometer device comprising:
   a) a case for containing components, the case having an interior portion defining a threaded tube;
   b) an adjusting head comprising:

i) a cap shaped body with a cored bottom;
ii) a pointer extending from a peripheral portion of the cap shaped body; and
iii) a tubular body extending downwardly from the cap shaped body, the tubular body defining external threads threadingly engaging the threaded tube and internal thread;

c) a scale board attached to the case and having scale means disposed upon an upper surface for visual cooperation with the pointer;

d) a micro adjusting screw threadingly engaged with the internal threads of the tubular body such that an end portion of the adjusting screw extends beyond the tubular body;

e) a thrust body attached to the case and defining a passageway adapted to be connected to a pressurized fluid;

f) an electric conducting plate disposed across the passsageway defined by the thrust body such that, when the pressure in the passageway reaches a preset value, the conducting plate contacts the end portion of the micro adjusting screw; and, g) control means electrically connected to the micro adjusting screw and the conducting plate such that the control means is actuated by contact between the conducting plate and the micro adjusting screw.

* * * * *